US012808761B2

(12) United States Patent
Rakowska et al.

(10) Patent No.: US 12,808,761 B2
(45) Date of Patent: Nov. 24, 2026

(54) RAPID PASSIVE SAMPLING KIT FOR MEASURING DISSOLVED HYDROPHOBIC CHEMICALS IN SEDIMENT POREWATER

(71) Applicant: Texas Tech University System, Lubbock, TX (US)

(72) Inventors: Magdalena Rakowska, Lubbok, TX (US); Danny Reible, Austin, TX (US); Balaji Anandha Rao, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 0 days.

(21) Appl. No.: 19/365,035

(22) Filed: Oct. 21, 2025

(65) Prior Publication Data

US 2026/0110605 A1 Apr. 23, 2026

Related U.S. Application Data

(60) Provisional application No. 63/710,269, filed on Oct. 22, 2024.

(51) Int. Cl.
*G01N 1/34* (2006.01)
*G01N 1/12* (2006.01)

(52) U.S. Cl.
CPC ................. *G01N 1/34* (2013.01); *G01N 1/12* (2013.01)

(58) Field of Classification Search
CPC .................................. G01N 1/34; G01N 1/12
USPC ....................................................... 73/863.21
See application file for complete search history.

(56) References Cited

U.S. PATENT DOCUMENTS

| | | | | |
|---|---|---|---|---|
| 6,541,272 | B1 * | 4/2003 | Mitra | G01N 1/34 73/23.35 |
| 7,222,546 | B2 * | 5/2007 | St. Germain | G01N 1/2294 73/863.23 |
| 11,759,558 | B2 * | 9/2023 | Potkay | A61M 1/00 422/48 |
| 12,019,083 | B2 * | 6/2024 | Sliz | B01D 19/0063 |
| 2010/0068821 | A1 | 3/2010 | St. Germain | |
| 2014/0322518 | A1 * | 10/2014 | Addleman | B01D 69/125 427/244 |
| 2020/0292516 | A1 | 9/2020 | Kaltenberg et al. | |
| 2021/0129141 | A1 * | 5/2021 | Sadabadi | G01F 1/383 |
| 2021/0213418 | A1 * | 7/2021 | Paull | B01J 20/20 |
| 2022/0236154 | A1 * | 7/2022 | Truong | G01N 1/405 |
| 2023/0399540 | A1 * | 12/2023 | Miljkovic | C09D 183/14 |

* cited by examiner

*Primary Examiner* — Marrit Eyassu

(74) *Attorney, Agent, or Firm* — Patterson + Sheridan, LLP

(57) ABSTRACT

Embodiments of the present disclosure generally relate to a rapid passive sampling kit for measuring dissolved hydrophobic chemicals in porewater. Specifically, the embodiments disclosed herein are related to a rapid passive sampling kit that is operable to be used in in-situ and ex-situ testing of porewater samples. The method includes inserting a substrate into a vessel, the substrate comprising a polydimethylsiloxane (PDMS) film disposed over the substrate, the PDMS film comprising a volume of PDMS of about 2 μL to about 210 μL, providing the sample with a sample volume into the vessel such that the sample contacts at least the PDMS film, equilibrating the sample for about 24 hours to about 48 hours, and extracting a plurality of compounds of interest from the substrate.

20 Claims, 6 Drawing Sheets

RAPID PASSIVE SAMPLING KIT FOR MEASURING DISSOLVED HYDROPHOBIC CHEMICALS IN SEDIMENT POREWATER

CROSS-REFERENCE TO RELATED APPLICATION

This application claims the benefit of and priority to U.S. Provisional Application No. 63/710,269, filed Oct. 22, 2024, which is incorporated by reference herein in its entirety.

STATEMENT OF FEDERALLY FUNDED RESEARCH

This disclosure was made with government support under Grant No. 2017022 awarded by the National Science Foundation. The government has certain rights in the disclosure.

BACKGROUND

Field

Embodiments of the present disclosure generally relate to a rapid passive sampling kit for measuring dissolved hydrophobic chemicals in porewater. Specifically, the embodiments disclosed herein are related to a rapid passive sampling kit that is operable to be used in in-situ and ex-situ testing of porewater samples.

Description of the Related Art

Porewater testing is an important tool in environmental science used to evaluate the presence and bioavailability of contaminants in sediment or soil interstitial water (porewater). Porewater is the water trapped between sediment particles. Testing porewater for hydrophobic organic compounds, such as polycyclic aromatic hydrocarbons (PAHs), polychlorinated biphenyls (PCBs), dioxins/furans, and polychlorinated aromatic compounds, provides a high-quality indicator of organism response, bioavailability, bioaccumulation and toxic effects, whereas the association of organism response to bulk solid concentration is often poor.

Conventional methods for testing porewater include both direct extraction and passive sampling techniques. Direct methods include centrifugation, vacuum extraction, or physically pressing the sample to separate porewater from sediment. The porewater is then filtered and analyzed. Passive methods include using synthetic polymer samplers. The passive methods are typically used in-situ and the compounds of interest diffuse into the sampler over time. The compounds of interest are then extracted and analyzed. Conventional methods pose various problems for scientists testing porewater. For example, direct extraction sampling may disturb the sediment structure and require large sample volumes for accurate analysis. Passive sampling typically requires long timelines to reach equilibrium (e.g., 30 days), which is a requirement for accurate analysis.

Accordingly, what is needed in the art are improved methods and devices for passive sampling.

SUMMARY

In a first embodiment, a method for testing a sample is disclosed. The method includes inserting a substrate into a vessel, the substrate comprising a polydimethylsiloxane (PDMS) film disposed over the substrate, the PDMS film comprising a volume of PDMS of about 2 microliters (μL) to about 210 μL, providing the sample with a sample volume into the vessel such that the sample contacts at least the PDMS film, equilibrating the sample for about 24 hours to about 48 hours, and extracting a plurality of compounds of interest from the substrate.

In another embodiment, a rapid passive sampling kit is disclosed. The rapid passive sampling kit includes a polydimethylsiloxane (PDMS) film disposed over a substrate, the PDMS film comprising a thickness of about 2 micrometers (μm) to about 10 μm, and a vessel operable to contain a sample and the substrate.

In another embodiment, a rapid passive testing kit is disclosed. The rapid passive testing kit includes a polydimethylsiloxane (PDMS) film disposed over a substrate, the PDMS film comprising a thickness of about 2 micrometers (μm) to about 10 μm and the substrate comprising a surface area of about 10 square centimeters ($cm^2$) to about 220 $cm^2$ and a means for a sample to be tested.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments of the disclosure and are therefore not to be considered limiting of the scope of the disclosure, and may admit to other equally effective embodiments.

DETAILED DESCRIPTION

Figure 1:
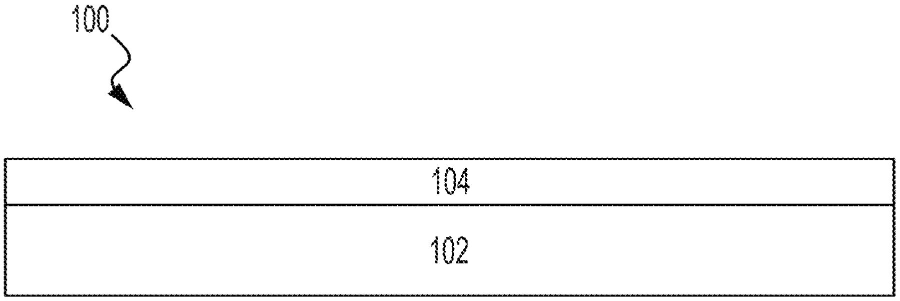
FIG. 1 is a cross-sectional view of a substrate with a polydimethylsiloxane (PDMS) film disposed over a substrate, according to certain embodiments.

Embodiments of the present disclosure generally relate to a rapid passive sampling kit for measuring dissolved hydrophobic chemicals in porewater. Specifically, the embodiments disclosed herein are related to a rapid passive sampling kit that is operable to be used in in-situ and ex-situ testing of porewater samples. Porewater is defined as the water contained in pores of sediment or soil.

The rapid passive sampling kit disclosed herein is operable to conduct a passive sampling method on porewater samples. For ex-situ testing, the rapid passive sampling kit at least includes a substrate, a polydimethylsiloxane (PDMS) film disposed over the substrate, and a vessel (e.g., a jar or a container). For in-situ testing, the PDMS film disposed over the substrate is coupled onto a support within an in-situ passive sampler. The PDMS film is operable to uptake the compounds of interest such as hydrophobic chemicals of interest from a porewater sample. The PDMS film provides the means for a passive sampling method relying on spontaneous mass transfer of the analyte from the sample to the sorbent (e.g., the PDMS film) caused by the difference in chemical potentials between the sample (e.g., porewater) and the sorbent (e.g., the PDMS film).

In one or more embodiments, the rapid passive sampling kit is meant for collection of bulk sediment samples ex-situ. The rapid passive sampling kit is operable to determine the "freely" dissolved concentrations in sediments or saturated soils by exposing an ultra-thin coating of a PDMS film on a substrate with target compounds present in a sample. The sample is sediment or soil interstitial water (porewater). The PDMS film is operable to uptake a plurality of molecules of interest or compounds of interest. In one or more embodiments, the target compounds are hydrophobic organic compounds. For example, the target compounds are polynuclear aromatic hydrocarbons (PAHs), polychlorinated biphenyls (PCBs), dioxin/furans, polychlorinated aromatic compounds, or combinations thereof in an amount that is proportional to the freely dissolved concentration of the compound in the associated porewater. The freely dissolved concentration provides an indicator of organism response, bioavailability, bioaccumulation, toxic effects, or combinations thereof. In comparison, the association of organism response to bulk solid concentration (mg per kg of contaminants in a solid sample) is often poor and while easy to collect as data, provide minimal insight on important data that relates to the organisms in the field or sampling area. The ability to measure the concentration, in pg/L or ng/L, of individual target compounds depends upon equilibration of the contaminant uptake into the rapid passive sampling kit and the total volume (e.g., mass) of the PDMS film 104.

Conventional approaches for measuring contaminants via passive sampling rely on PDMS films as a 30-100 micrometers (μm) layer coated onto small diameter (<1 mm) glass fibers, or low-density polyethylene (LDPE) or PDMS in sheets 25 μm to 250 μm thick. The glass fibers include a very small volume of PDMS limiting the detection limit in water even after the passive sampler is equilibrated with the porewater. The LDPE and the PDMS in sheets typically exhibit very slow kinetics, particularly LDPE which is inherently slower to equilibrate than PDMS. When compared to the present disclosure, conventional methods require an extended equilibration time. The rapid passive sampling kit disclosed herein is operable to achieve equilibrium in less than 10% of the time required to reach equilibrium with conventional methods.

FIG. 1 is a cross-sectional view of a substrate 102 with a polydimethylsiloxane (PDMS) film 104 disposed over the substrate 102, according to certain embodiments. The rapid passive sampling kit 100 includes the substrate 102 with the PDMS film 104 and a means for a sample to be tested. In one or more embodiments, the rapid passive sampling kit 100 for ex-situ testing further includes a vessel 302 (shown in FIGS. 3B and 3C) as the means for the sample to be tested operable to contain the substrate 102 and a sample 304. In one or more embodiments, the rapid passive sampling kit 100 for in-situ testing further includes an in-situ passive sampler 500 (shown in FIG. 5) as the means for the sample to be tested. The in-situ passive sampler 500 is a support to retain the one or more substrates 102 each having a PDMS film 104.

In one or more embodiments the substrate 102 is an aluminum material. For example, the substrate 102 is an aluminum sheet or aluminum foil. In one or more embodiments, the substrate 102 is any semi-flexible material that is operable to support the PDMS film 104. In one or more embodiments, the substrate 102 includes a thickness of about 16 μm to about 24 μm. In one or more embodiments, the substrate 102 is any inorganic material that does not easily tear, does not absorb the target compounds, and can be rolled into a tube shape (e.g., the tube shaped substrate 312 shown in FIG. 3E). In one or more embodiments, the substrate 102 includes a surface area of 10 square centimeters ($cm^2$) to greater than 220 $cm^2$. In one or more embodiments the PDMS film 104 includes a thickness of about 2 μm to about 10 μm. In one or more embodiments, a ratio of the thickness of the PDMS film 104 to the surface area of the substrate is about 1:44 or about 4:44. In one or more embodiments, the PDMS film 104 includes the same surface area as the substrate 102. For example, the substrate 102 includes dimensions of about 14.6 cm by 7.3 cm or about 14.6 cm×14.6 cm. For example, the substrate 102 includes an area of about 100 $cm^2$ to about 200 $cm^2$. For example, the PDMS film 104 includes a thickness of about 2 μm to about 10 μm. In one or more embodiments, the PDMS of the PDMS film 104 includes a volume of about 21 microliters (μL) to about 210 μL. In one or more embodiments, the PDMS film 104 includes a mass of about 20 mg to about 210 mg. In one or more embodiments, the substrate 102 is about 5 cm by 2 cm and includes a PDMS film thickness of 6 μm. The area and thickness are tunable to meet the objectives of a passive sampling project. In one or more embodiments, the thickness of the PDMS film 104 is about 10% to about 20% of the thickness of the substrate.

Despite the reduced thickness of the substrate 102 and the PDMS film 104, the substrate 102 and PDMS film 104 provides a surface area with a significant PDMS volume. For a fast equilibration of the sample, the PDMS film 104 includes a relatively thin thickness over the surface area of the substrate 102. For example, the ratio of the thickness of the PDMS film 104 as described above to the length of a side of the substrate 102 as described above is about 1:1500 or 1:7500. Further, the combination of fast kinetics (e.g., a time of equilibration) and large volume of PDMS maximizes the ability to detect low concentrations of contaminants in a sample 304 (e.g., porewater). For example, in one or more embodiments, the vessel 302 is operable to contain a volume of sample such that the ratio of mass of the sample 304 to mass of the PDMS film 104 is above 1000:1 (i.e., sample: PDMS). In another example, the rapid passive sampling kit 100 containing a sample 304 of 200 g and a PDMS film 104 with a 14.7 cm by 14.7 cm dimension and a 10 μm thickness includes a ratio of mass of the sample 304 to mass of the PDMS film 104 of about 1 million:1.

Figure 5:
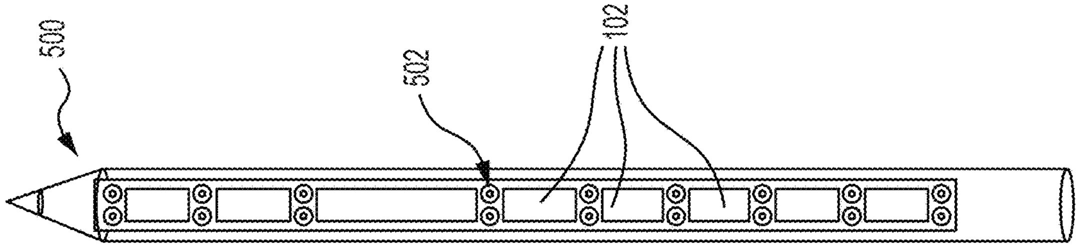
FIG. 5 is a representative example of an in-situ sampler, according to certain embodiments.

In one or more embodiments, the substrate 102 with the PDMS film 104 is used for in-situ testing in the field. For example, as shown in FIG. 5, the substrate 102 is coupled to an in-situ passive sampler 500 to measure porewater concentrations as a function of depth in saturated soil or sediments. In an example, the in-situ passive sampler 500 includes a polycarbonate cylinder core that includes a diameter of about 5 cm and a length of about 80 cm. However, it should be understood that the in-situ passive sampler 500 may include any dimension or material which can support and protect the substrate 102 coupled to a passive sampling layer (e.g., the PDMS film 104) and placed at least along one side or along a length of the in-situ passive sampler 500. The in-situ passive sampler 500 includes a stainless steel point for easy placement into soft sediments. The in-situ passive sampler 500 includes a coarse protective screen 502 disposed over the substrate 102. The in-situ passive sampler 500 includes a plurality of substrates (e.g., substrate 102). Each substrate 102 of the plurality of substrates has a PDMS film 104. For example, the in-situ passive sampler 500 includes 8 to 10 substrates 102 that are placed vertically along the in-situ passive sampler 500 such that the in-situ passive sampler 500 is operable to determine depth profiles. In one or more embodiments, the in-situ passive sampler 500 includes substrates (e.g., substrate 102) disposed along the length of the in-situ passive sampler 500.

Figure 2:
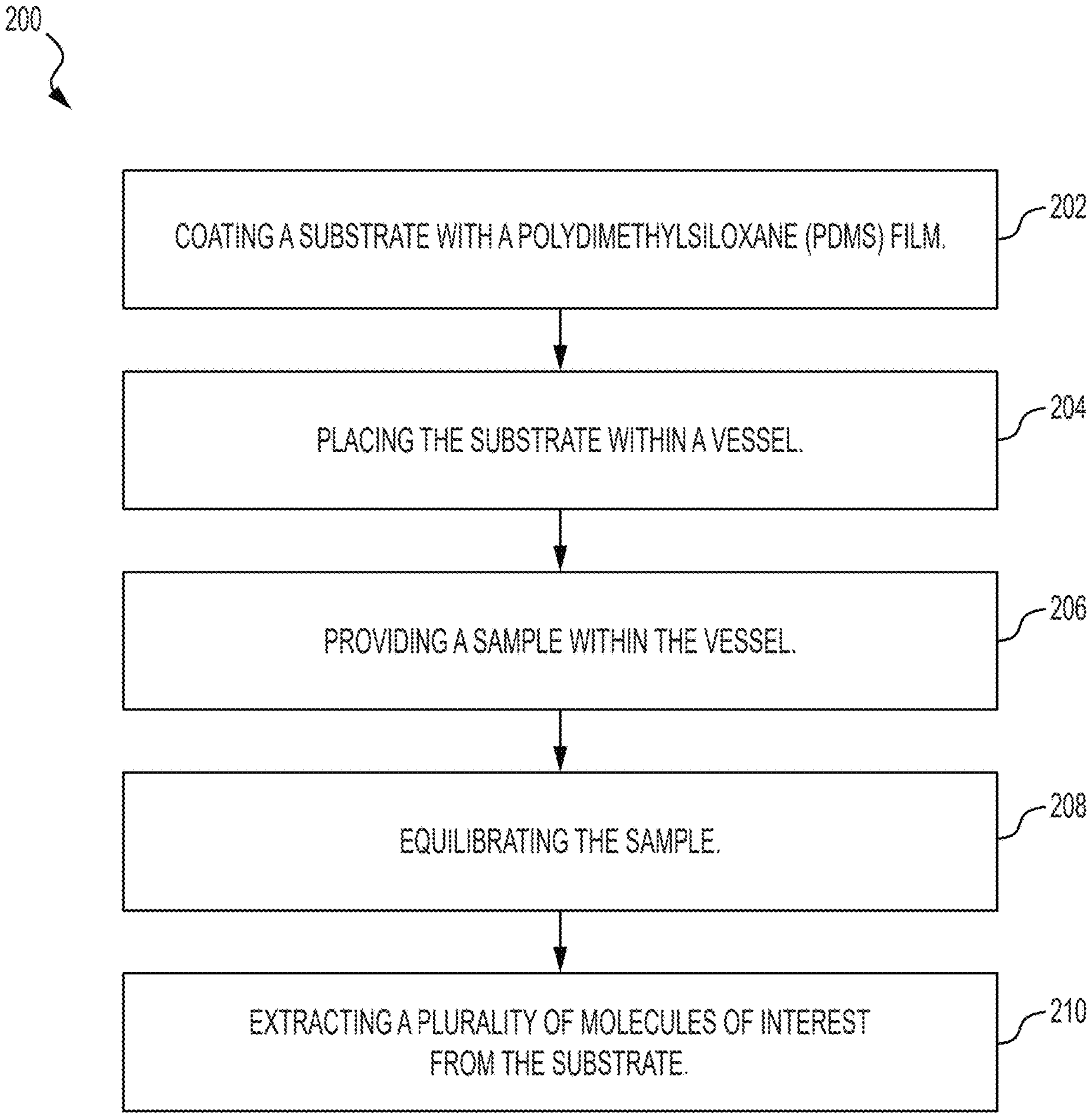
FIG. 2 is a method flow diagram for a method of using a rapid passive sampling kit, according to certain embodiments.

FIG. 2 is a method flow diagram for a method 200 of using a rapid passive sampling kit, according to certain embodiments. FIGS. 3A, 3B, 3C, 3D, 3E, and 3F are various views of the rapid passive sampling kit 100 during the method 200 of using the rapid passive sampling kit 100, according to certain embodiments.

Figures 3A, 3B, 3C:
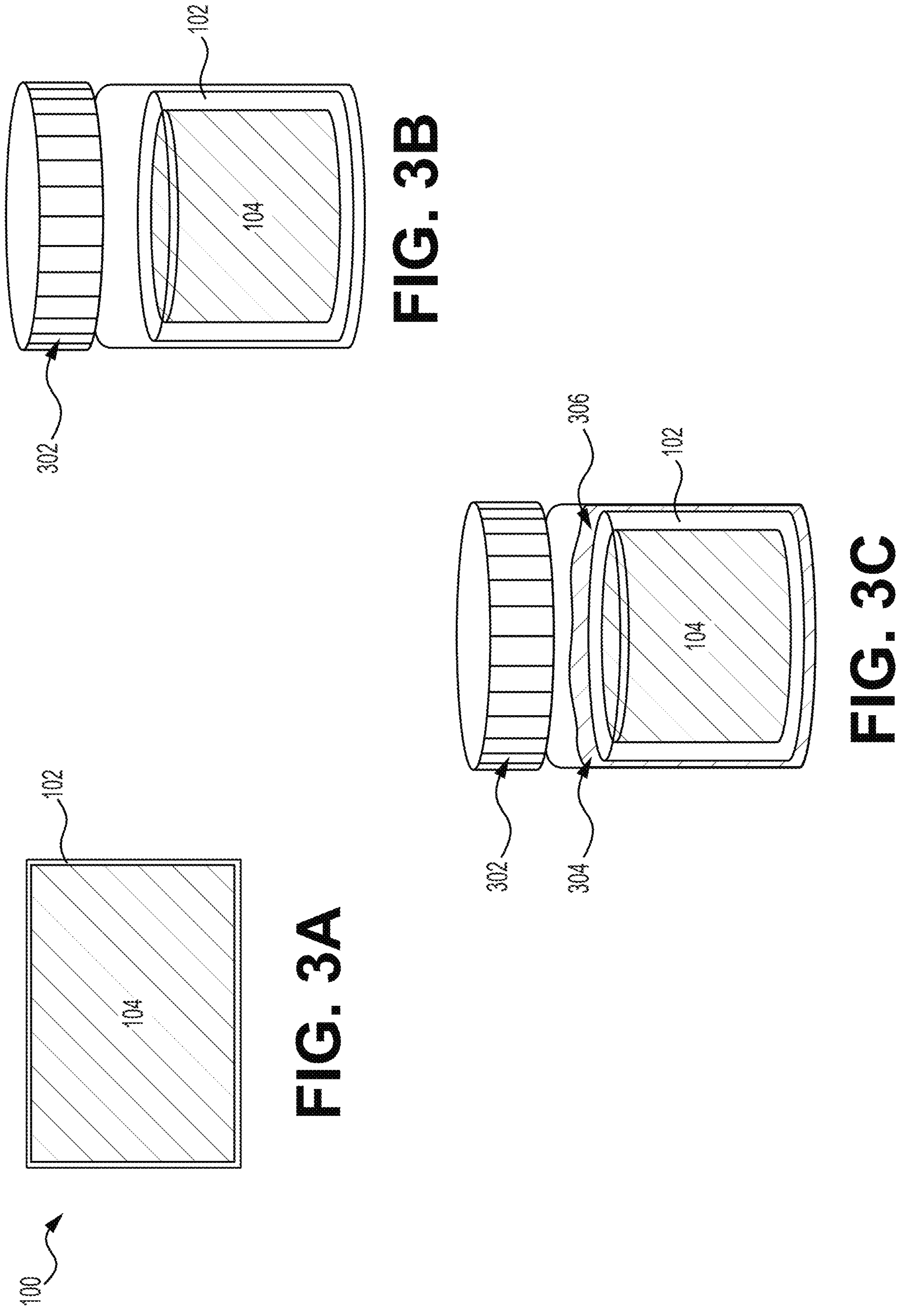
FIGS. 3A, 3B, 3C, 3D, 3E, and 3F are various views of the rapid passive sampling kit during the method of using the rapid passive sampling kit, according to certain embodiments.
Figure 3F:
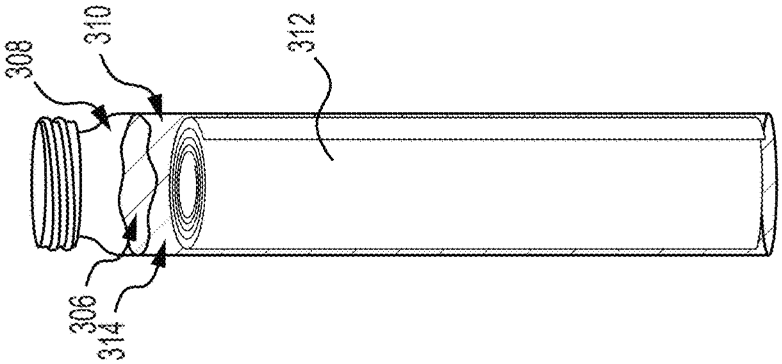

At operation 202, as shown in FIG. 3A, the substrate 102 is coated with the PDMS film 104. In one or more embodiments the PDMS film 104 is coated onto the substrate 102 via a spin-coating process.

A PDMS solution is prepared in preparation for the spin-coating process. The materials used for the PDMS solution include elastomer base (MDX4-4210 Biomedical grade, Dow Corning), elastomer curing agent (MDX4-4210 Biomedical grade, Dow Corning), and an organic solvent. An example elastomer base is MDX4-4210 Biomedical grade, Dow Corning. An example curing agent is MDX4-4210 Biomedical grade, Dow Corning. An example organic solvent is hexane. The elastomer curing agent, the elastomer base and the hexane are combined at a ratio of volume of curing agent to volume of elastomer base to volume of hexane is approximately 1:1.75:12. The ratio allows for the formation of a reliable and smooth PDMS film. For example, 8 g of the elastomer curing agent, 14 g of the elastomer base, and 160 mL of hexane are added to a beaker, capped, and stirred (e.g., with a stir bar) for about 1.5 hours to about 3 hours at about 250 RPM to about 270 RPM. This example produces enough PDMS solution to coat about 4 to 6 substrates when each substrate has a surface area of about 213.16 $cm^2$ (e.g., dimensions of about 14.6 cm by 14.6 cm) with a PDMS film thickness of about 2.3 μm to about 9 μm.

In one or more embodiments, the substrate 102 is an aluminum substrate. The substrate 102 includes a label side and a PDMS film side. For example, the aluminum substrate may be aluminum foil or aluminum roll. The substrate 102 includes a thickness of about 16 μm to about 24 μm. The aluminum substrate is sized to include dimensions of about 14.6 cm by 14.6 cm. However, it should be understood that the aluminum substrate may be any size compatible with a chuck on a spin-coater. After the substrate 102 is sized, the substrate 102 is soaked or rinsed with methanol to remove any contaminants. The substrate 102 is then dried in an oven at about 100 °C. In one or more embodiments, the substrate 102 is labeled on the label side. Each substrate 102, with the label, is weighed and the weight is recorded. The substrate 102 can be stored in an air-tight container until coating.

To coat the substrate 102 with the PDMS film 104, a spin coating process is used. The PDMS solution is transferred into a syringe. To obtain a PDMS film 104 having a uniform thickness, air bubbles in the syringe and any instrument components are avoided. The substrate 102 is placed on the chuck in a spin coat machine. The spin coat machine is prepared according to standard instructions. For example, the $N_2$ cylinder is open, the outlet gas pressure is about 60 psi to 70 psi, the vacuum pump is activated, and the appropriate program or process is selected. The vacuum secures the substrate 102 to the chuck. After the spin coating process is complete, the substrate 102 with a PDMS film 104 is removed from the spin coating machine and placed in a clean area for a minimum of 30 minutes. The PDMS film 104 is cured overnight in a clean oven at 100 °C. After curing, the weight of the substrate 102 is recorded. In one or more embodiments, the substrate 102 is cut to size such that the substrate 102 will fit into the vessel 302 for sample equilibration while providing a PDMS film 104 with enough volume to appropriately capture the target compounds from the sample 304 (Shown in FIG. 3). For example, the substrate 102 with the PDMS film 104 is cut into sheets measuring 14.6 cm by 7.3 cm. The PDMS film 104 includes a thickness of about 2.3 μm. In one or more embodiments, the thickness of the PDMS film 104 is controlled by the spinning speed during the spin-coating process. In an example, the PDMS film 104 with dimensions of about 14.6 cm by about 14.6 cm includes a PDMS mass of about 40 mg to about 210 mg and a PDMS volume of about 42 μL to about 216 μL.

To determine the volume and thickness of the PDMS film 104 on each substrate, the following equation may be used:

mass of the PDMS film=mass of substrate after coating−mass of substrate before coating The volume (in $cm^3$) of the PDMS film 104 on each substrate 102 is calculated with the following equation:

$$\text{Volume of } PDMS \text{ film} = \frac{\text{mass of } PDMS \text{ film}}{\text{density of the material}}$$

The thickness (cm) of the PDMS film 104 is calculated with the following equation:

$$\text{Thickness} = \frac{\text{Volume of } PDMS \text{ film}}{\text{Surface area of substrate}}$$

For example, the substrate 102 disclosed above includes a surface area equal to 14.6×14.6=213.16 $cm^2$ and PDMS film 104 disclosed above includes a density equal to 0.965

$$\frac{\text{g}}{\text{cm}^3}.$$

At operation 204, as shown in FIG. 3B, the substrate 102 is placed within the vessel 302. In one or more embodiments, the substrate 102 is flexible such that the substrate 102 conforms to the shape of the vessel 302. For example, the substrate 102 fits along at least a portion of a wall of the vessel 302. In one or more embodiments, the PDMS film 104 is facing the interior of the vessel 302, as shown in FIG. 3B. The vessel 302 may have a volume of about 8 ounces (i.e., about 237 mL). The vessel 302 may be glass, such as amber glass. The vessel 302 may be a jar. The vessel 302 provides a defined volume of sample 304 collected such that total (bulk) concentrations of target compounds may be determined. The vessel 302 may be any size that is operable to hold a ratio of sample mass to PDMS mass above 1000:1.

At operation 206, as shown in FIG. 3C, the sample 304 is provided into the vessel 302. In ex-situ testing, the sample 304 includes enough volume to at least submerge the substrate 102. In one or more embodiments, the moisture content should be at least 20% by weight or more to ensure the soil or sediment in the sample 304 is saturated. In one or more embodiments, if the sample 304 is dry, water can be added to increase the moisture content. In an embodiment starting with a sample 304 that is dry, the sample 304 should reconstitute for at least 48 hours to allow the water and the sample 304 to equilibrate before combining the sample 304 in the vessel 302 with the substrate 102. The sample 304 is soil or sediment samples collected in the field. Once the sample 304 is provided into the vessel 302, the vessel 302 is closed as soon as possible (e.g., immediately). For ex-situ testing, the vessel 302 is sent back to a laboratory for testing.

In in-situ testing, the in-situ passive sampler 500 is placed in the field at least partially disposed within the sediment or soil and then retrieved after about 1 to 2 days to achieve 80% or more of equilibrium for even strongly hydrophobic compounds. As shown in FIG. 5, each substrate 102 is mounted within the in-situ passive sampler 500. Each substrate 102 would contact the sediment or soil sample when placed in the field to allow for equilibration.

Figure 3D:
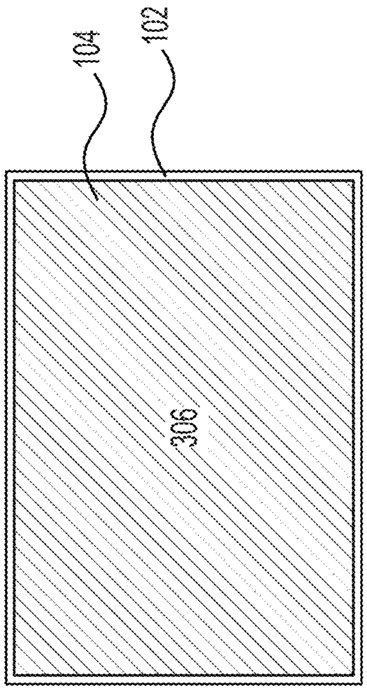

At operation 208, the sample 304 is equilibrated within the vessel 302 with the substrate 102. For ex-situ testing, the sample 304 equilibrates with the PDMS film 104 for about 24 hours to about 48 hours. During equilibration the sample 304 is constantly mixed. For example, the vessel 302 is placed on a roller and mixed intensively at about 70 RPM to about 80 RPM for about 24 hours to about 48 hours. In one or more embodiments, equilibration may be used interchangeably with exposure time. As shown in FIG. 3D, the PDMS film 104 has taken up a plurality of compounds of interest 306 during equilibration. For example, the plurality of compounds of interest 306 diffuse into the PDMS film 104, this occurs by passive diffusion.

Figure 3E:
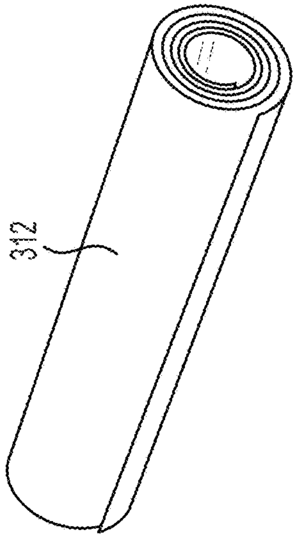

At operation 210, the compounds of interest 306 are extracted from the substrate 102. The compounds of interest 306 are hydrophobic organic compounds such as polynuclear aromatic hydrocarbons (PAHs), polychlorinated biphenyls (PCBs), dioxin/furans, polychlorinated aromatic compounds, or combinations thereof. The substrate 102 is removed from the vessel 302, the substrate 102 is cleaned, and the PDMS film 104 is extracted from the substrate 102 for testing. For example, the substrate 102 is removed from the vessel 302 and cleaned with a damp particle free tissue. As shown in FIG. 3E, the substrate is rolled into a tube shape. The tube shaped substrate 312 is placed into a testing vessel 308. For example, the testing vessel 308 is a 60 mL amber vial. In one or more embodiments, the testing vessel 308 is filled with a solvent 314. The solvent 314 is an acetone:dichloromethane (DCM) mixture in a 1:1 ratio. The volume of solvent 314 added to the testing vessel 308 is enough to submerge the tube shaped substrate 312. For example, 40 mL of the solvent 314 is added to the testing vessel 308. The testing vessel 308 is vortexed to allow for desorption of analytes from the PDMS film 104. The testing vessel 308 is vortexed for about 1 minute. After vortexing, the testing vessel 308 includes the solvent 314 and extractions 310 in an aqueous form. The extractions 310 include at least the plurality of compounds of interest 306. The solvent 314 is extracted and transferred to a testing vessel 308 (different than the previous testing vessel). The testing vessel 308 with the tube shaped substrate 312 is filled with an additional 20 mL of the solvent 314 and vortexed for about 1 minute. The solvent 314 from both extractions 310 is combined. The extractions 310, which include the plurality of compounds of interest 306 are reduced in volume from about 80 mL to about 1 mL with a solvent evaporation unit.

The plurality of compounds of interest 306 in the extractions 310 are analyzed with chromatography techniques with appropriate sample pretreatment using surrogate and internal standard additions. The results obtained from the chromatographic analysis are used for calculating the freely dissolved concentrations (in μg/L or ng/L) in sediment porewater. To calculate the freely dissolved concentrations the following equation is used:

$$Cfree = \frac{C_{PDMS}}{K_{PDMS}} = \frac{A * RSF * V_{solvent}}{M_{PDMS} * K_{PMDS}}$$

where: A is the area of the chromatography peak, RSF is the response factor from a calibration curve unique to the tested compounds of interest (e.g., test compound), $V_{solvent}$ is the final volume of the extract in liters, $M_{PDMS}$ is the mass of the PDMS film in kilograms, and $K_{PDMS}$ is the PDMS-water partitioning coefficient in L/Kg.

Figure 4:
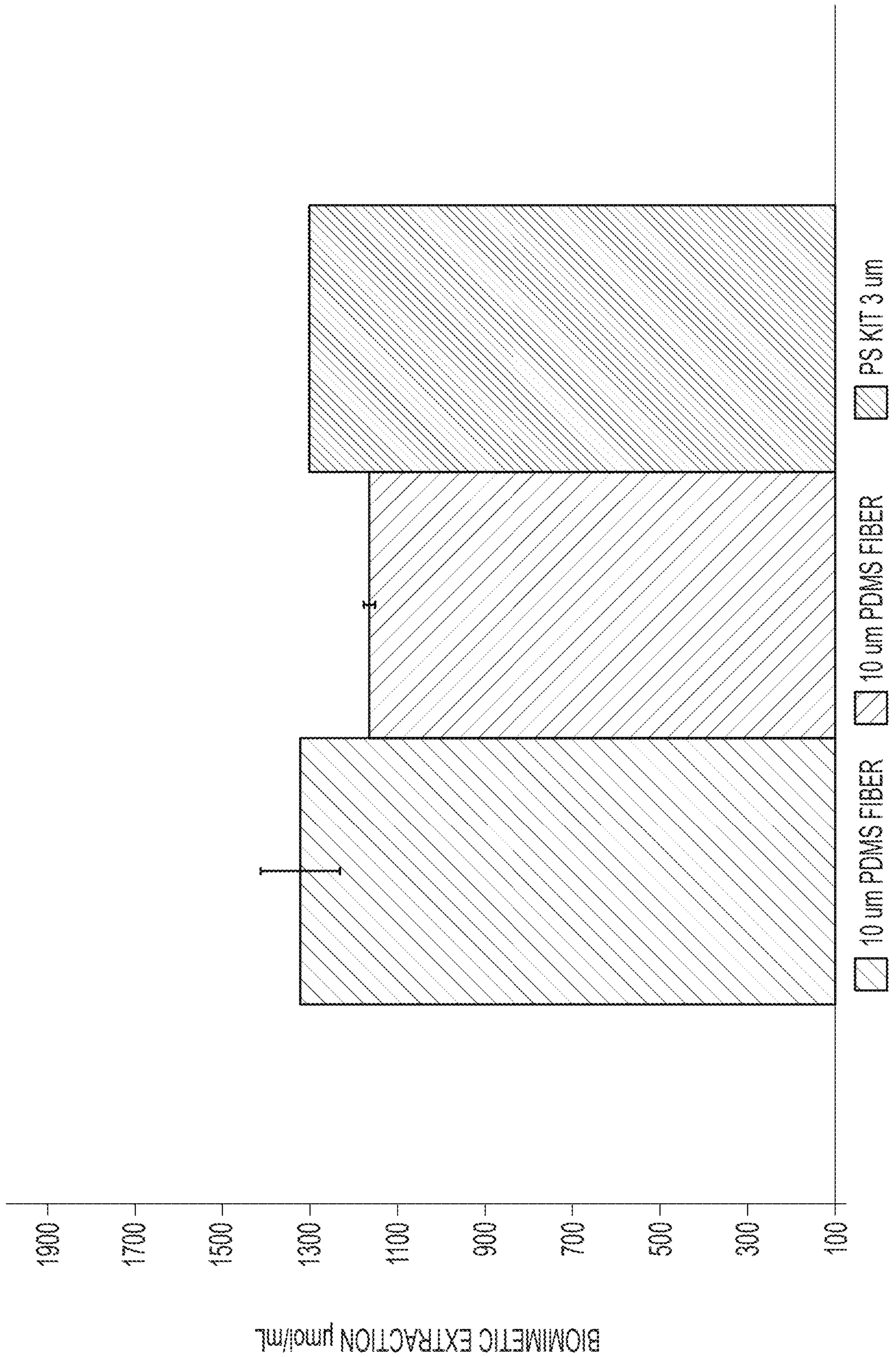
FIG. 4 is a bar graph showing biometric extraction differences between different test kits, according to certain embodiments.

FIG. 4 is a bar graph showing biomimetic extraction (BE) differences between different test kits, according to certain embodiments. These data comparisons can be used as an indication of rapid equilibration without a loss of accuracy with regards to the rapid passive sampling kit 100 when compared to conventional methods. BE is a method for evaluating potential organism response (toxicity and/or bioaccumulation) to complex mixtures of hydrocarbons but essentially involve passive sampling by sorption of components of the mixture onto the PDMS. BE is a non-specific indicator of organism response without the need to identify specific hydrocarbon constituents that make up the response. The BE is quantified in micromoles per milliliter of PDMS. FIG. 4 shows the BE for ex-situ samples. As shown in FIG. 4, the rapid passive sampling kit 100 with a 3 μm PDMS film 104, a PDMS fiber with a 10 μm coating, and a PDMS fiber with a 30 μm coating were tested and compared. Both the PDMS fiber with a 10 μm coating and the PDMS fiber with a 30 μm coating were exposed to Indiana Harbor sediment for 28 days. The rapid passive sampling kit 100 with PDMS film with a 3 μm thickness was exposed to the Indiana Harbor sediment for 1 day. As shown in FIG. 4, all three test groups achieved a similar BE. The results indicate the rapid passive sampling kit 100 achieves similar results in a significantly reduced exposure time (e.g., equilibration time).

Examples

In an example, a substrate 102 with dimensions of about 5 cm by 2 cm and a PDMS film 104 with a thickness of 6 μm contains the same PDMS volume as 10 cm of PDMS fiber with a 30 μm PDMS coating on a 500 μm glass core. In conventional applications, only 2 cm to 5 cm of the PDMS fiber might be used in a passive sampling measurement. Accordingly, the disclosed PDMS film 104 in the rapid passive sampling kit 100 provides 2-5 times more PDMS volume and equal improvements in detection limits while allowing for equilibration 10-20 times more quickly than conventional methods.

Figure 6:
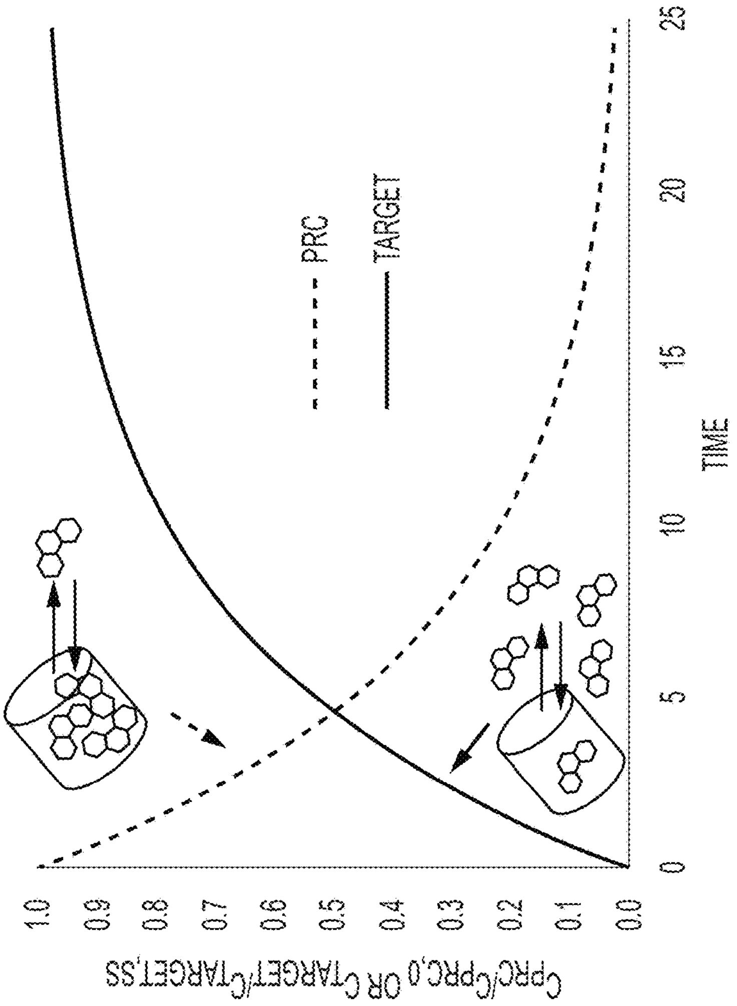
FIG. 6 is a representative chart showing the conceptual behavior of performance reference compounds during a kinetics estimation, according to certain embodiments.

In an example, the kinetics of the PDMS film 104 were tested and compared to a conventional method. The kinetics were estimated using performance reference compounds (PRC). The conceptual behavior of PRCs in which the preloaded PRC equilibrates by releasing into the soil or sediment while a similar target compound for which concentration is sought is equilibrating into a passive sampler (e.g., the testing kit 100) at the same rate is shown in FIG. 6. The PRC are preloaded onto the PDMS material. The PRC is released from the PDMS material during exposure to a sample (e.g., sediment). Simultaneously, target compounds of similar properties to the PRC are taken up by the PDMS material at a similar or at the same rate. The PRC tested was deuterated chrysene. For example, on a 500 μm glass fiber with a 30 μm PDMS coating required 28 days of loading to reach equilibrium with an accuracy of ±10%. In comparison, the rapid passive sampling kit 100 required 14 days or less to load deuterated chrysene onto a PDMS film 104 with a thickness of 6 μm with an accuracy of 3.3%. Equilibration to an equal degree of variability as the fibers would have occurred much more rapidly. Accordingly, the results indicate the rapid passive sampling kit 100 includes a greater accuracy in less time when compared to a conventional method.

In an example, the PDMS film 104 was evaluated for target uptake evaluations and compared to a conventional method. Target uptake of chrysene and PCB 209 (decachlorobiphenyl) were tested for three different testing kits. A 30 μm PDMS coating on a 500 μm glass fiber was exposed to a contaminated sediment for 30 days. The 30 μm PDMS coating on a 500 μm glass fiber achieved about 80% equilibration for chrysene and about 50% equilibration for PCB 209. A 12 μm layer of LDPE was exposed to the contaminated sediment for 30 days. The 12 μm layer of LDPE achieved about 25% equilibration for chrysene and about 12% equilibration for PCB 209. The rapid passive sampling kit 100 (e.g., the 6 μm of PDMS film on an aluminum substrate) was exposed to the contaminated sediment for 30 days. The rapid passive sampling kit 100 achieved 98% equilibration for chrysene and 94% equilibration for PCB 209. In another example, the rapid passive sampling kit 100 was exposed to the contaminated sediment for 2 days. After 2 days, the rapid passive sampling kit 100 achieved 93% equilibration for chrysene and 78% equilibration for PCB 209. Accordingly, the rapid passive sampling kit 100 achieved results closer to equilibrium when compared to the conventional PDMS or LDPE passive sampler.

The ability to measure very low concentrations using the rapid passive sampling kit 100 due to the combination of large surface area with a thin layer of PDMS is illustrated in Table 1. Table 1 shows a comparison between the disclosed rapid passive sampling kit 100 and a conventional 1 cm fiber with 0.6 μl of PDMS. As shown in Table 1, about 100 g to about 200 g of sediment is placed in rapid passive sampling kit 100 due with the substrate 102 and the PDMS film 104 where the PDMS film 104 includes dimensions of 14.6 cm×14.6 cm and a thickness of 3 μm. In one or more embodiments, the results are not affected by sediment mass as long as the mass of sediment or soil is much greater than the mass of the PDMS layer. The detection limits are a practical quantification limit (PQL) assuming an ability to measure 1 μg/L from a 1 mL final volume of extract for the plurality of target compounds 306 except dioxin (TCDD) for which a 1 μg/L and a 20 μL final volume of extract is assumed. These are commonly used analysis values. As noted previously, the equilibration time required to achieve the detection limits shown in Table 1 are at least 10 times faster for the rapid passive sampling kit 100 compared to the conventional fibers. Table 1 confirms that the rapid passive sampling kit 100 improves detection limits by a factor of more than 100 with a reduced equilibration time. Table 1 shows detection limits via the rapid passive sampling kit 100 versus conventional fibers for 1 μg/L detectable concentration from a 1 mL final extract volume (TCDD 20 μg/L final extract volume).

TABLE 1

| Target Compound | Log Kow | Log K_PDMS | Rapid Passive Sampling Kit 14.6 × 14.6 × 3 μm PQL in porewater, pg/L | Conventional Fiber PQL in porewater 1 cm of 30 μm layer on 500 μm core pg/L |
|---|---|---|---|---|
| Phenanthrene | 4.57 | 3.93 | 1810 | 186000 |
| Pyrene | 5.18 | 4.46 | 535 | 55000 |
| Chrysene | 5.91 | 4.96 | 169 | 17400 |
| Benzo[a]pyrene | 6.04 | 5.44 | 56 | 5760 |
| TCDD (dioxin) 20 μL final extract volume | 6.8 | 5.78 | 0.51 | 5.3 |

Overall, embodiments of the present disclosure generally relate to a rapid passive sampling kit for measuring dissolved hydrophobic chemicals in porewater. Specifically, the embodiments disclosed herein are related to a rapid passive sampling kit that is operable to be used in in-situ and ex-situ testing of porewater samples. When compared to the present disclosure, conventional methods require an extended equilibration time. The rapid passive sampling kit disclosed herein is operable to achieve equilibrium about 90% faster than conventional methods. This provides savings up to 80% in sediment cleanup costs. This methodology offers a convenient passive sampling for dissolved concentration combined with collection of bulk sediment in one device. Ultra-thin PDMS coating (2.3 μm) ensures fast equilibration with porewater in tested sediment (24-48 hours) as compared to other passive sampling approaches that require at least 28 days of contact time. Exceptional sensitivity achieved with a 30 times larger PDMS film sampling surface area.

While the foregoing is directed to embodiments of the present disclosure, other and further embodiments of the disclosure may be devised without departing from the basic scope thereof, and the scope thereof is determined by the claims that follow.

What is claimed is:

1. A method for testing a sample, comprising:

inserting a semi-flexible substrate into a vessel, the semi-flexible substrate comprising a substantially uniform polydimethylsiloxane (PDMS) film disposed on substantially all of the semi-flexible substrate, the substantially uniform PDMS film comprising;

a thickness of about 2 micrometers (μm) to about 10 (μm); and a volume of PDMS of about 2 microliters (μL) to about 210 μL, the semi-flexible substrate having a semi-flexible substrate surface area and the substantially uniform PDMS film having a PDMS film surface area that are substantially the same, wherein the semi-flexible substrate is operable to be rolled and unrolled between a tube shape and a substantially planar shape;

providing the sample with a sample volume into the vessel such that the sample contacts at least the substantially uniform PDMS film;

equilibrating the sample for about 24 hours to about 48 hours; and extracting a plurality of compounds of interest from the semi-flexible substrate.

2. The method of claim 1, wherein the substantially uniform PDMS film comprises:
an elastomer base;
an elastomer curing agent; and
an organic solvent.

3. The method of claim 1, wherein the substantially uniform PDMS film is spin coated onto the semi-flexible substrate.

4. The method of claim 1, wherein the semi-flexible substrate comprises aluminum and is at least semi-flexible.

5. The method of claim 1, wherein the equilibrating the sample further comprises constantly mixing the sample within the vessel at about 70 RPM to about 80 RPM.

6. The method of claim 1, wherein the plurality of compounds of interest are polynuclear aromatic hydrocarbons (PAHs), polychlorinated biphenyls (PCBs), dioxin/furans, polychlorinated aromatic compounds, or combinations thereof.

7. The method of claim 1, wherein a ratio of a mass of the sample to a mass of the substantially uniform PDMS film is about 1000:1.

8. The method of claim 1, wherein extracting the plurality of compounds of interest from the semi-flexible substrate further comprises:
removing the semi-flexible substrate from the vessel and cleaning the semi-flexible substrate;
rolling the semi-flexible substrate into the tube shape to form a tube shaped substrate and placing the tube shaped substrate into a testing vessel;
adding a solvent to the testing vessel; and
vortexing the solvent and the tube shaped substrate.

9. The method of claim 8, wherein adding the solvent to the testing vessel and vortexing the solvent and the tube shaped substrate is repeated at least once.

10. A rapid passive sampling kit, comprising:
a semi-flexible substrate operable to be rolled and unrolled between a tube shape and a substantially planar shape;
a substantially uniform polydimethylsiloxane (PDMS) film disposed on substantially all of the semi-flexible substrate, the substantially uniform PDMS film comprising;
a thickness of about 2 micrometers (μm) to about 10 μm; and
a PDMS film surface area of the PDMS film that is substantially the same as a semi-flexible substrate surface area of the semi-flexible substrate; and
a vessel operable to contain a sample and the semi-flexible substrate.

11. The rapid passive sampling kit of claim 10, wherein the semi-flexible substrate comprises aluminum.

12. The rapid passive sampling kit of claim 10, wherein the semi-flexible substrate comprises a surface area of about 10 square centimeters ($cm^2$) to about 220 $cm^2$.

13. The rapid passive sampling kit of claim 10, wherein the substantially uniform PDMS film comprises a mass of about 20 mg to about 210 mg.

14. The rapid passive sampling kit of claim 10, wherein a ratio of the thickness of the substantially uniform PDMS film to a surface area of the semi-flexible substrate is about 1:44 to about 4:44.

15. The rapid passive sampling kit of claim 10, wherein the vessel is operable to contain a mass ratio of a mass of the sample to the mass of the substantially uniform PDMS film, the mass ratio is about 1000:1.

16. A rapid passive sampling kit, comprising:
a semi-flexible substrate operable to be rolled and unrolled between a tube shape and a substantially planar shape;
a substantially uniform polydimethylsiloxane (PDMS) film disposed on substantially all of the semi-flexible substrate, the substantially uniform PDMS film comprising:
a thickness of about 2 μm to about 10 μm; and
a PDMS film surface area of the PDMS film that is substantially the same as a semi-flexible substrate surface area of the semi-flexible substrate, wherein the PDMS film surface area and the semi-flexible substrate area are about 10 square centimeters ($cm^2$) to about 220 $cm^2$; and
a means for a sample to be tested with the semi-flexible substrate.

17. The rapid passive sampling kit of claim 16, wherein the means for the sample to be tested is a vessel operable to contain a sample and the semi-flexible substrate, and wherein the vessel consists of a single opening.

18. The rapid passive sampling kit of claim 17, where the vessel is operable to at least contain a mass of the sample and a mass of the substantially uniform PDMS film wherein, a ratio of the mass of the sample to the mass of the substantially uniform PDMS film is about 1000:1.

19. The rapid passive sampling kit of claim 16, wherein the means for the sample to be tested is an in-situ passive sampler wherein a plurality of semi-flexible substrates are coupled to the in-situ passive sampler.

20. The rapid passive sampling kit of claim 19, wherein each semi-flexible substrate of the plurality of semi-flexible substrates is at least partially disposed into sediment or soil for about 1 to 2 days for equilibration.

* * * * *